United States Patent [19]
Stropkay

[11] Patent Number: 5,277,444
[45] Date of Patent: Jan. 11, 1994

[54] VEHICLE WATER SPRAY CONTROL DEVICES

[75] Inventor: Edward J. Stropkay, Chesterland, Ohio

[73] Assignee: Transgard, Inc., Willoughby, Ohio

[21] Appl. No.: 914,263

[22] Filed: Jul. 15, 1992

[51] Int. Cl.$^5$ ............................................. B62B 9/16
[52] U.S. Cl. .................................... 280/848; 280/851
[58] Field of Search ................. 280/848, 851, 762, 847, 280/855; 296/81, 82, 83, 198, 193

[56] References Cited

U.S. PATENT DOCUMENTS

| | | | |
|---|---|---|---|
| 3,743,343 | 7/1973 | Grote, Sr. et al. | 280/851 |
| 3,834,732 | 9/1974 | Schons | 280/851 |
| 4,192,522 | 3/1980 | Morgan | 280/851 |
| 4,205,861 | 6/1980 | Roberts et al. | 280/851 |
| 4,334,694 | 6/1982 | Iwanicki | 280/851 |
| 4,585,242 | 4/1986 | Sparks | 280/851 |
| 4,640,541 | 2/1987 | Fitzgerald et al. | 280/851 |
| 4,655,468 | 4/1987 | Cunningham | 280/851 |
| 4,706,981 | 11/1987 | Dorwart | 280/851 |
| 4,877,268 | 10/1989 | Price | 280/851 |

*Primary Examiner*—Richard M. Camby
*Attorney, Agent, or Firm*—Renner, Otto, Boisselle & Sklar

[57] ABSTRACT

A spray control device for controlling the lateral discharge of spray generated by the rotation of a wheel of a wheeled vehicle during its forward movement over a wet surface, comprises a hollow body mountable to a sidewall of the vehicle above and laterally outwardly in relation to the wheel of the vehicle. The hollow body has a vertically elongated forwardly opening inlet at a forward end thereof for intaking air into the hollow body during forward movement of the vehicle, a horizontally elongated laterally inwardly directed outlet at a lower edge of the body, and at least one channel extending from the inlet to the outlet for directing air flow from the inlet to the outlet, which channel decreases in cross-sectional area from the inlet to the outlet whereby air flow speed is increased to create a high velocity air screen directed inwardly above and across the wheel toward the center of the vehicle. According to another embodiment, a spray control device comprises a hollow body mountable to the vehicle for extending over the wheel of the vehicle. The hollow body has a bottom fender wall with a downwardly curved rear end portion for concentric disposition with the wheel of corresponding diameter and at least one channel extending from an inlet to an outlet. The bottom fender includes a plurality of eductor openings communicating with the channel, and the channel decreases in cross-sectional area from the inlet to the outlet whereby air flow speed is increased to create a corresponding pressure drop operative to draw water spray through the eductor openings for discharge through the outlet in a downward and inward direction. A further embodiment combines features of the other embodiments.

19 Claims, 4 Drawing Sheets

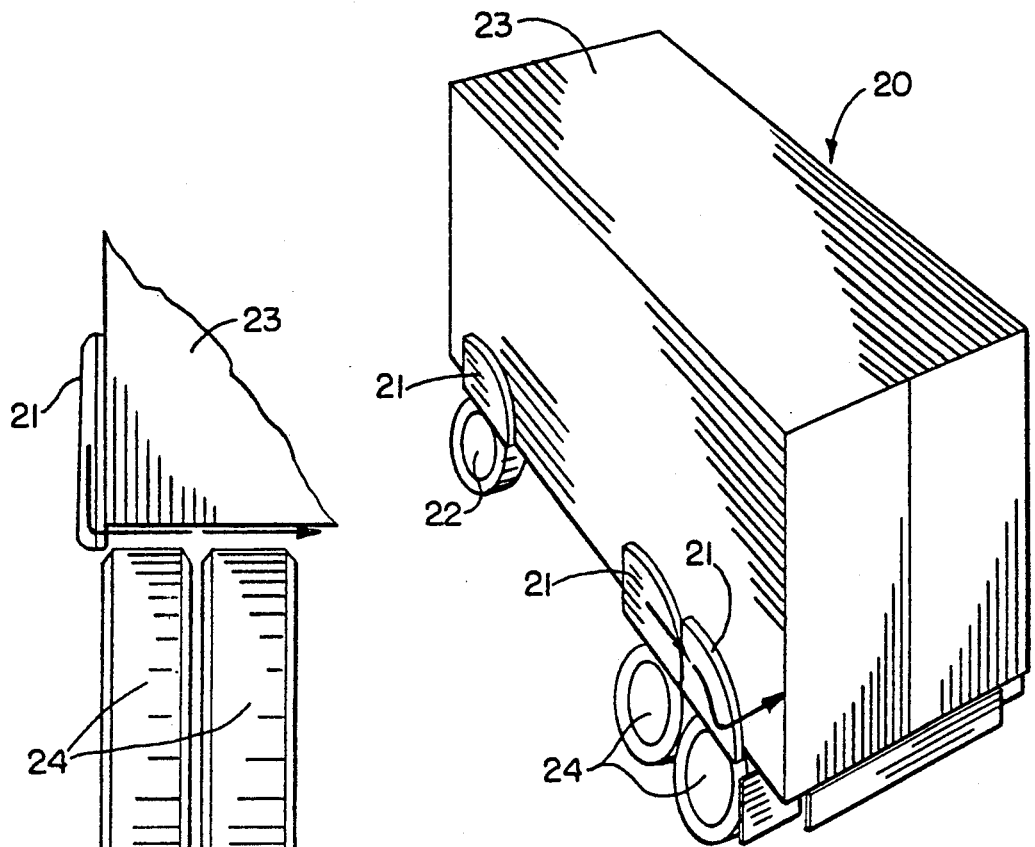
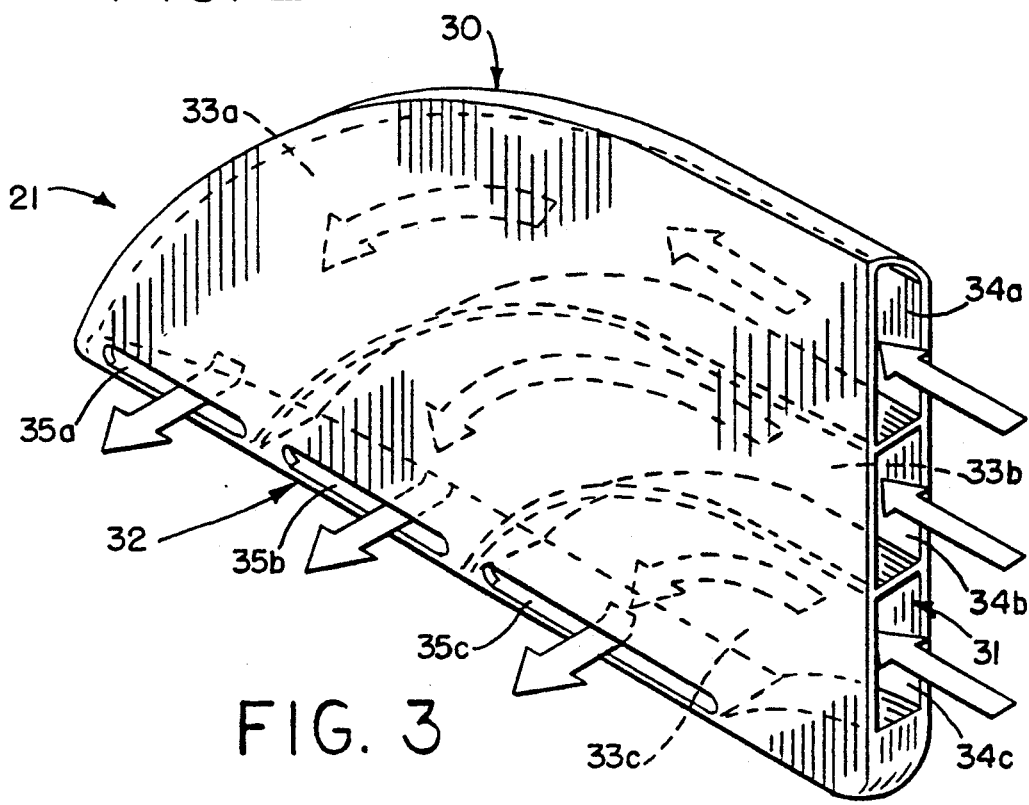

VEHICLE WATER SPRAY CONTROL DEVICES

The invention hereindescribed relates to devices for controlling the water spray generated by the rotation of the wheels of large vehicles, such as trucks and trailers, during forward movement of such wheeled vehicles over a wet surface.

BACKGROUND

A common problem encountered during highway driving is the visibility obscuring water spray that is generated by trucks, tractor-trailer rigs and other large wheeled vehicles. As the wheeled vehicle moves over a wet surface, the rotation of its wheels generates a water spray of a mist-like consistency that is turbulently discharged from the vehicle in a direction generally transverse to the direction of vehicle movement. In many cases this lateral discharge of spray can so obscure visibility as to make it extremely hazardous to drive past such a vehicle under wet road conditions.

SUMMARY OF THE INVENTION

The present invention provides means for controlling the lateral discharge of spray generated by the rotation of a wheel of a wheeled vehicle, such as a truck or a trailer, during its forward movement over a wet surface. According to one aspect of the invention, such a means is provided by a spray control device comprising a hollow body mountable to a sidewall of the vehicle above and laterally outwardly in relation to the wheel of the vehicle. The hollow body has a vertically elongated forwardly opening inlet at a forward end thereof for intaking air into the hollow body during forward movement of the vehicle, a horizontally elongated laterally inwardly directed outlet at a lower edge of the body, and at least one channel extending from the inlet to the outlet for directing air flow from the inlet to the outlet. In a preferred embodiment, such channel decreases in cross-sectional area from the inlet to the outlet whereby air flow speed is increased to create a high velocity air screen directed inwardly above and across the wheel toward the center of the vehicle. More particularly, the spray control device scoops air from the side of the vehicle and then accelerates it to create a high velocity air screen directed above and across the wheel towards the center of the vehicle. consequently, the spray that is generated by surface water that is thrown by the rotating wheel against the underside of the vehicle body will be directed laterally inwardly by the high velocity air screen rather than laterally outwardly.

According to another aspect of the invention, a spray control device for controlling the discharge of water spray generated by the rotation of a wheel of a vehicle over a wet surface comprises a hollow body mountable to the vehicle for extending over the wheel of the vehicle. The hollow body has a bottom fender wall with a downwardly curved rear end portion for concentric disposition with the wheel of corresponding diameter, a forwardly opening inlet at a forward end of the hollow body for intaking air into the hollow body during forward movement of the vehicle, an outlet at a rearward end of the body, and at least one channel extending from the inlet to the outlet for directing air flow from the inlet to the outlet. Such channel terminates at a rear end portion thereof that extends inwardly and downwardly at the outlet for directing air downwardly and laterally inwardly out through the outlet toward the center of the vehicle. The bottom fender includes a plurality of eductor openings communicating with the channel, and the channel decreases in cross-sectional area from the inlet to the outlet whereby air flow speed is increased to create a corresponding pressure drop operative to draw water spray through the eductor openings. In operation, air accelerated through the chamber creates an eductor effect and causes water spray to be drawn through the eductor openings for mixing with the air flow in the channel and exhausting through the outlet both downwardly and inwardly toward the center of the vehicle.

According to a further aspect of the invention, a spray control device for controlling the discharge of water spray generated by the rotation of a wheel of a vehicle over a wet surface, comprises a hollow body having an upright body portion and a horizontal body portion configured for mounting to a side of the vehicle with the upright body portion disposed above and laterally outwardly in relation to the wheel of the vehicle and the horizontal body portion extending over the wheel. The hollow body has a vertically elongated forwardly opening inlet at a forward end of the upright body portion for intaking air into the hollow body during forward movement of the vehicle, a horizontally elongated laterally inwardly directed outlet at a laterally inner edge of the horizontal body portion, and at least one channel extending from the inlet to the outlet for directing air flow from the inlet to the outlet. The horizontal body portion has a bottom fender wall including a plurality of eductor openings communicating with the channel, and the channel decreases in cross-sectional area from the inlet to the outlet whereby air flow speed is increased to create a corresponding pressure drop operative to draw water spray through the eductor openings for mixing with the air flow in the channel and exhausting through the outlet toward the center of the vehicle.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a perspective view of a semitrailer incorporating spray control devices according to one embodiment of the present invention, with rear wheels of a tractor also being shown.

FIG. 2 is an enlarged fragmentary rear end elevational view of the semitrailer showing a rear view of the spray control device.

FIG. 3 is a further enlarged perspective view of the spray control device.

DETAILED DESCRIPTION

Figure 4:
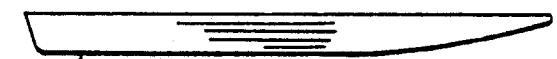
FIG. 4 is a top plan view of the spray control device.
Figure 7:
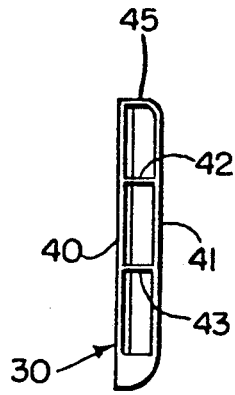
FIG. 7 is a front end view of the spray control device, taken from the line 7—7 of FIG. 5.

Referring now in detail to the drawings and initially to FIGS. 1 and 2, a wheeled vehicle 20 has incorporated therein a spray control device 21 according to the present invention. More specifically, the illustrated wheeled vehicle is the semitrailer of a tractor-trailer rig. As is typical of tractor-trailer rigs, the trailer for transport along a road surface is removably connected to a tractor, only one rear wheel 22 of which is shown. The trailer 20 includes a body 23 normally supported at its front end by the tractor and at its rear end by eight rear wheels 24. The wheels 24 are mounted in tandem at the ends of two axles secured to the underside of the trailer body 23.

Each set of tandem wheels 24 has associated therewith a corresponding spray control device 21 mounted to the adjacent sidewall of the trailer body 23. The spray control devices are positioned above and laterally outwardly in relation to the corresponding wheel or wheel set as shown in FIGS. 1 and 2. The trailer body 23 may also have mounted to the side wall thereof additional spray control devices for correspondence with the rear wheels 22 of the tractor when the trailer is connected to the tractor. The spray control devices preferably are identical in construction although the devices on the right-hand side of the trailer 20 will be mirror images of the devices on the left-hand side of the trailer. For the sake of brevity, a representative one of the spray control devices is further illustrated in FIGS. 3-8 and is hereinafter described in detail.

The spray control device 21 comprises a hollow body 30 having a vertically elongated forwardly opening inlet 31 at its forward end for intaking air into the hollow body during forward movement of the trailer, a horizontally elongated laterally inwardly directed outlet 32 at lower edge of the hollow body, and at least one channel (33a-c) extending from the inlet 31 to the outlet 32 for directing air flow from the inlet to the outlet. In the illustrated embodiment three channels 33a-33c are provided. The three channels 33a-c have respective inlet openings 34a-34c which collectively form the inlet 31. Similarly, the three channels 33a-c have respective outlet openings 35a-c which collectively form the outlet 32.

Figure 5:
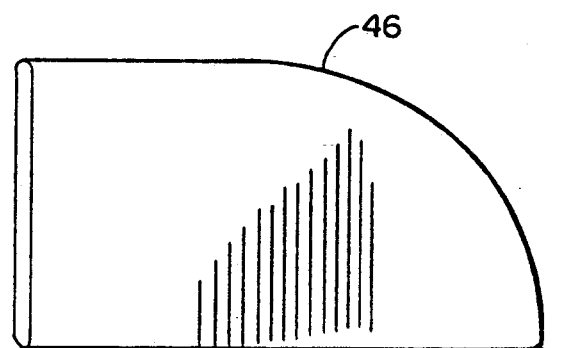
FIG. 5 is an outer side elevational view of the spray control device, taken from the line 5—5 of FIG. 4.
Figure 8:
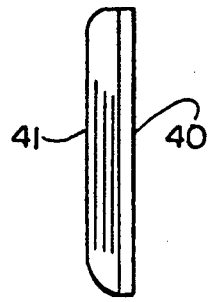
FIG. 8 is a rear end view of the spray control device, taken from the line 8—8 of FIG. 5.
Figure 6:
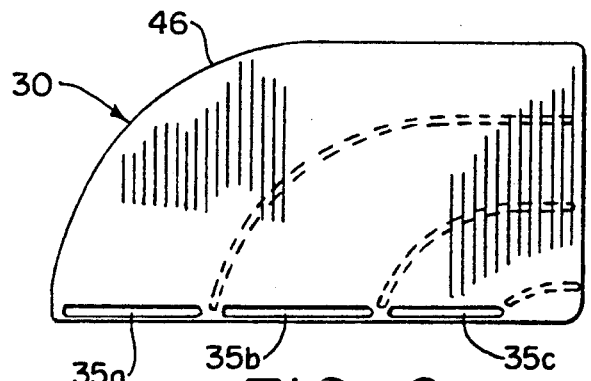
FIG. 6 is an inner side elevational view of the spray control device, taken from the line 6—6 of FIG. 4.
Figure 9:
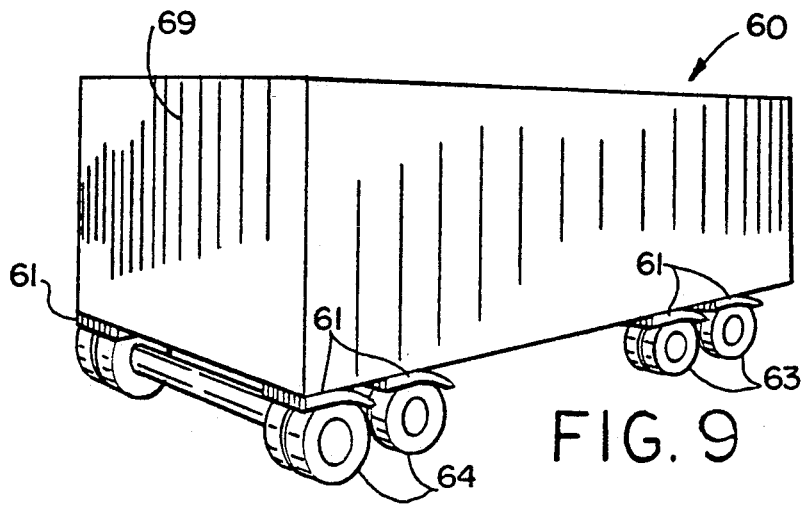
FIG. 9 is a perspective view of another semitrailer incorporating spray control devices according to another embodiment of the present invention, with rear wheels of a tractor also being shown.
Figure 15:
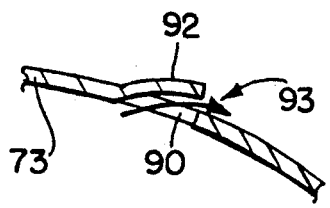
FIG. 15 is an enlarged, fragmentary sectional view showing in detail an eductor opening in the fender wall of the spray control device of FIG. 9.
Figure 13:
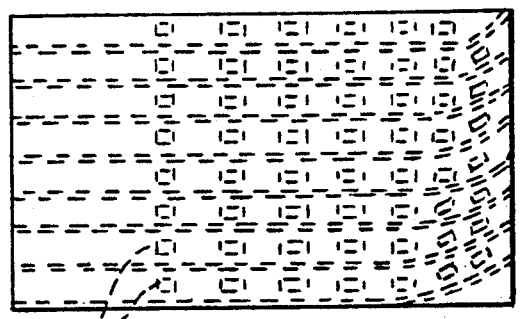
FIG. 13 is a top plan view of the spray control device of FIG. 9, taken from the line 13—13 of FIG. 10.
Figure 11:
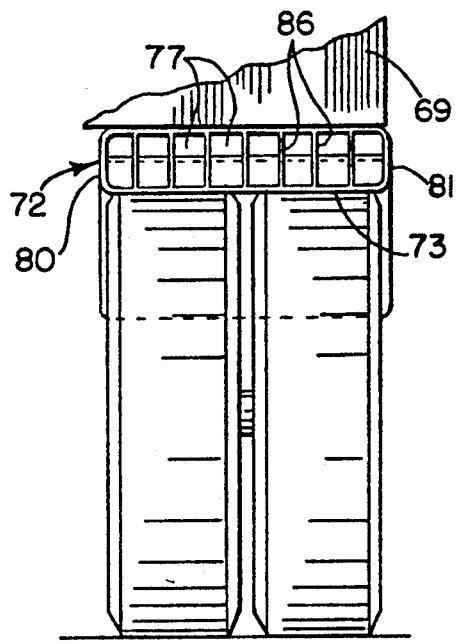
FIG. 11 is a front end elevational view of the spray control device of FIG. 9 shown in relation to tandem wheels of the vehicle and a fragment of the vehicle body, taken from the line 11—11 of FIG. 10.
Figure 10:
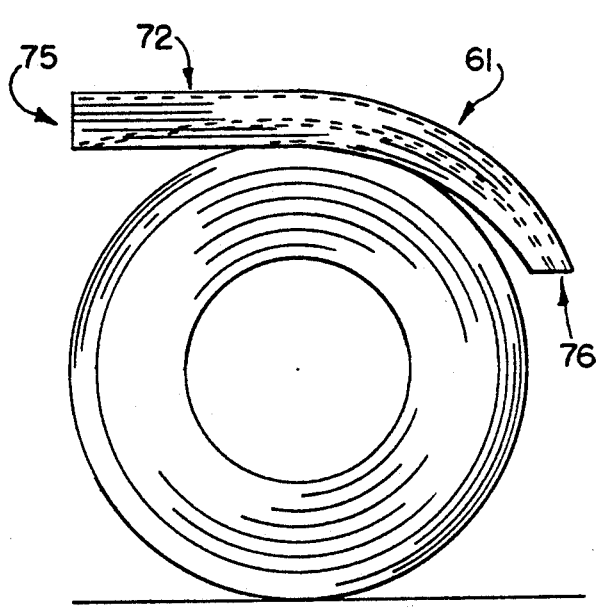
FIG. 10 is an enlarged outer side elevational view of the spray control device of FIG. 9 shown in relation to a wheel of the vehicle.
Figure 12:
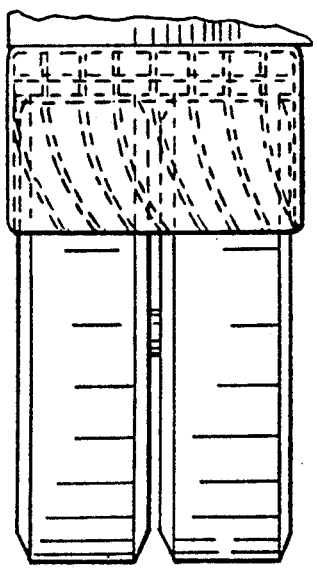
FIG. 12 is a rear end elevational view of the spray control device of FIG. 9 shown in relation to the tandem wheels of the vehicle and a fragment of the vehicle body, taken from the line 12—12 of FIG. 10.
Figure 14:
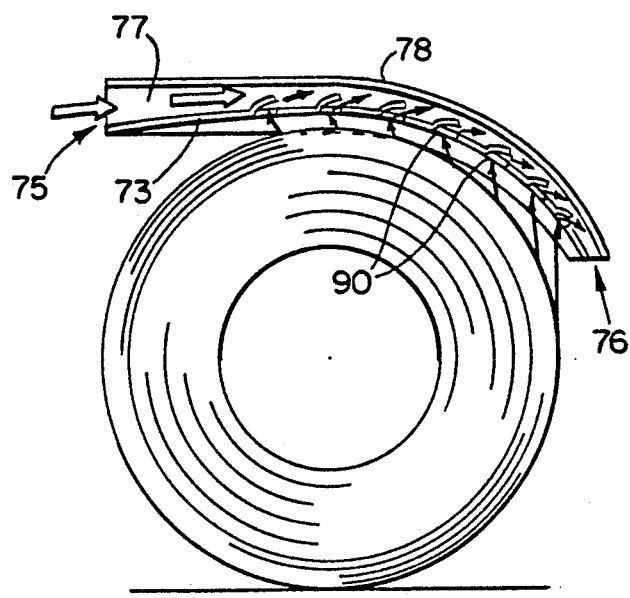
FIG. 14 is a vertical cross-sectional view of the spray control device of FIG. 9 shown in relation to a corresponding wheel of the vehicle, taken from the line 14—14 of FIG. 11.
Figure 16:
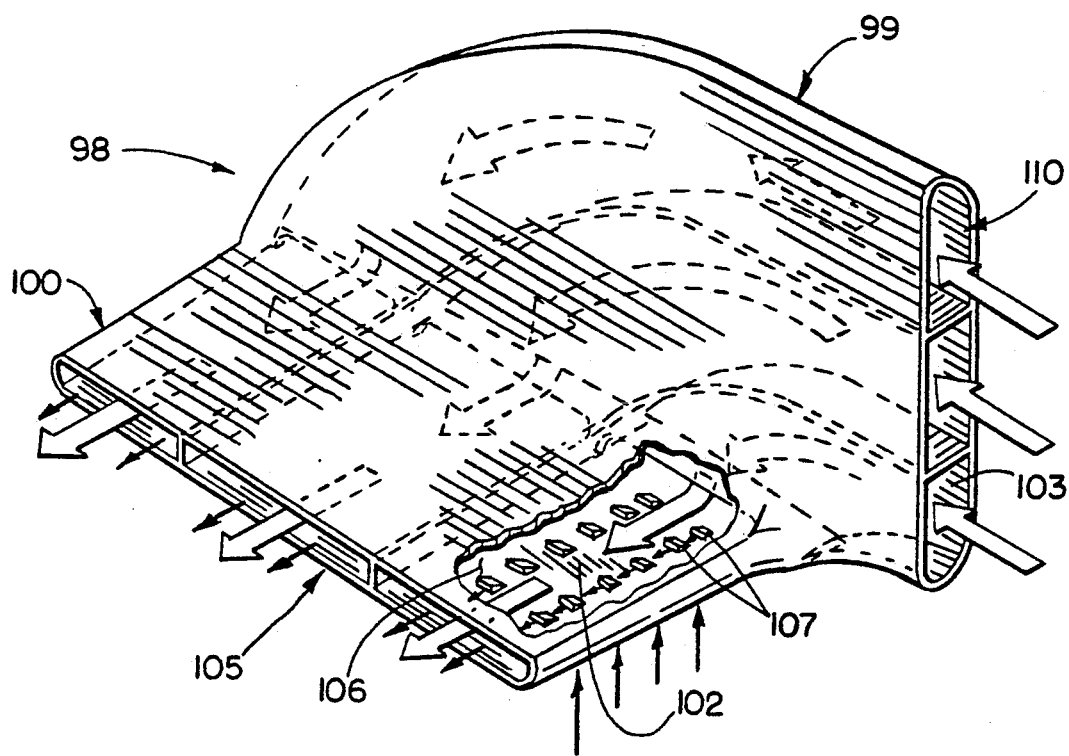
FIG. 16 is a perspective view of a spray control device according to a further embodiment of the invention.

The channels 33a-c are formed between inner and outer side walls 40 and 41 of the hollow body 30 and are separated from one another by partition walls 42 and 43 which extend between the inner and outer side walls 40 and 41. The upper edge portion 45 of the outer wall 41 curves laterally inwardly to join the inner wall 40 along an upper edge 46 of the hollow body. As best seen in FIGS. 3, 5 and 6, the upper edge 46 initially extends horizontally from the front end of the hollow body and then curves downwardly to the bottom rear end 47 of the hollow body. At the bottom of the hollow body 30 the lower edges of the inner and outer side walls 40 and 41 are joined together by a bottom wall 49 which tapers from a relatively wide dimension at the forward end of the body to a relatively narrow dimension at the rear end of the body. Correspondingly, the width of the hollow body tapers from a relatively wide dimension at its forward end to a relatively narrow dimension at its rear end as best illustrated in FIG. 4.

The partition walls 41 and 42 mimic the contour of the upper edge 46 of the hollow body 30 as best seen in FIGS. 3 and 6 to provide channels 33a-c which initially extend horizontally from the respective intake openings 34a-c and then curve downwardly to respective outlet openings 35a-c. At least one and preferably all of the channels 33a-c progressively decrease in cross-sectional area going from the inlet openings 34a-c to the outlet openings 35a-c. In the illustrated spray control device, this reduction in cross-sectional area is obtained by the positioning of the partition walls 41 and 42 and the above-mentioned tapering of the width of the hollow body. Each channel has a relatively wide inlet opening and a relatively narrow outlet opening. Also, as best seen in FIG. 6, the outlet opening 35c for the channel 33c is shorter than the more rearwardly located outlet openings 35a and 35b because of the relatively constant width of the channel 33c in the forward portion of the hollow body. On the other hand, the rearward most outlet opening 35a can be relatively longer because of the substantial reduction in cross-sectional area of the channel 33a resulting from the narrowing of the hollow body.

Regarding operation of the spray control device 21, initially it is noted that in the absence thereof the rotating wheel 24 of the trailer as it moves over a wet surface will pick up water and particles that are held to the wheel, or more particularly the tire thereof, by an adhesion force. At high speeds, the adhesion force is overcome and the water and particles entrained therein are separated from the wheel and flung upwardly into the turbulent air behind the wheel and against the underside of the trailer body 23. This so called spray or splash normally would be discharged from beneath the trailer outwardly in a direction generally transverse to the direction of trailer movement.

With the spray control device 21 installed as shown in FIGS. 1 and 2, during forward movement of the trailer 20 air will be taken in through the intake 31 at a volume rate related to the speed of the vehicle. In the spray control device, the air that has been scooped from the side of the trailer is accelerated in the channels 33a-33c to create a high velocity air screen exiting from the outlet 32 directly above and across the wheel toward the center of the trailer. As seen in FIG. 2, the lower edge portion of the device and consequently the outlet 32 is located below the bottom of the trailer body for passage of the air stream beneath the trailer body above the wheel or wheels. The air screen operates to direct the spray components laterally inwardly beneath the trailer to minimize the visibility inhibiting outward sidewise discharge of the spray. Preferably each wheel or set of tandem wheels has a water spray device 21 associated therewith, although a water spray device may be dimensioned to span two or more wheels or wheel sets arranged one in front of the other.

Referring now to FIG. 9, a wheeled vehicle 60 is shown equipped with spray control devices 61 according to another embodiment of the invention. The wheeled vehicle 60 that is illustrated is the trailer of a tractor-trailer rig. The trailer is equipped at its rearward end with four sets of tandem wheels 63 disposed at respective ends of two axles while its forward end is supported atop the rear end of the tractor, only the rear wheels 64 of which are illustrated. Each set of wheels 63 has associated therewith a spray control device 61 mounted to the underside of the trailer body 69. Spray control devices 61 also preferably are provided for the rear wheels 64 of the tractor, as by mounting to the bed of the tractor. The spray control devices 61 preferably are of identical construction, although the spray control devices on the right-hand side of the trailer will be mirror images of the those disposed on the left-hand side of the trailer. Accordingly, only one of the spray control devices will be described in greater detail.

In FIGS. 10–14, the spray control device 61 can be seen to comprise a hollow body 72 mounted to the trailer 60 directly over a wheel or set of laterally adjacent wheels in the case of tandem wheels as illustrated in FIGS. 11 and 12. The hollow body 72 has a bottom fender wall 73 that has a downwardly curved rear end portion for concentric disposition with the wheel or wheels of corresponding diameter. The hollow body further has a forwardly opening inlet 75 at its forward end for intaking air into the hollow body during forward movement of the vehicle, an outlet 76 at its rearward end, and at least one channel 77 extending from the inlet to the outlet for directing air flow from the inlet to the outlet.

Preferably a plurality of channels 77 are provided. In the illustrated embodiment, the channels 77 are formed between the bottom fender wall 73 and a top wall 78. The top wall 78 has parallel side edges which are joined to the side edges of the fender wall 73 by side walls 80 and 81 which may project beneath the fender wall 73 to form skirts extending along the sides of the hollow body 72. The skirts define with the fender wall an inverted U-shape channel extending from front to rear along the hollow body for facilitating the capture of water spray, i.e., water and particles being thrown upwardly from the rotating wheels of the vehicle. As seen in FIGS. 11 and 12, the body 72 is sized to span the combined width of the side-by-side wheels with which it is associated.

The channels 77 are separated from one another by partition walls 86. The partition walls 86 initially extend rearwardly from the front end of the body 72 and then curve laterally inwardly as they follow the downwardly curved rear end portion of the bottom fender wall 73. Accordingly, each channel terminates at a rear end portion thereof that extends inwardly and downwardly at the outlet 76 for directing air downwardly and laterally inwardly out through the outlet toward the center of the vehicle. As shown, the channels have respective inlet openings which collectively form the inlet 75 and respective outlet openings which collectively from the outlet 76.

As seen in FIGS. 13–15, each channel 77 has associated along the length thereof a plurality of eductor openings 90 which establish communication between the channel and the underside of the fender wall 73. Also, each channel decreases in cross-sectional area from the inlet 75 to the outlet 76 whereby air flow speed is increased to create a corresponding pressure drop operative to draw water spray through the eductor openings 90 for mixing with the air flow in the channel and exhausting through the outlet both downwardly and inwardly toward the center of the vehicle.

Each eductor opening preferably is a hooded opening as shown in FIG. 15, the hood 92 extending upwardly and rearwardly from the fender wall over the opening to define a rearwardly facing slot 93. The openings (or recesses) in the bottom fender wall 73 function to capture water and particles being thrown from the rotating wheel of the trailer to facilitate there being drawn through the rearwardly facing slots 93 into the air flow stream passing through the spray control device. As a result, water thrown upwardly from the rotating wheel of the trailer will be drawn into the spray control device where it is then channeled for discharge in a downward direction towards the center of the trailer.

Referring now to FIG. 16, another embodiment of spray control device 98 is illustrated. This device advantageously combines features associated with the two previously described devices. As shown, the spray control device 98 generally comprises an upright portion 99 and a horizontal portion 100. The upright body portion 99 is essentially identical to the spray control device 21 except that it is joined at its outlet to the horizontal body portion 100. Accordingly, the upright body portion 99 is intended to be mounted to the sidewall of a vehicle body with the horizontal body portion 100 extending underneath the vehicle body and directly over a wheel or wheels of the vehicle. The horizontal body portion 100 includes laterally extending continuations 102 of the channels 103 in the upright body portion for directing air flow to an outlet 105 at the laterally inner edge of the horizontal body portion. The horizontal body portion has a bottom fender wall 106 including a plurality of eductor openings 107 as in the manner described in connection with the spray control device 61 of FIGS. 9–15. The eductor openings 107 may be the same as illustrated in FIG. 15.

In operation of the spray control device 98, during forward movement of the vehicle air is scooped from the side of the vehicle body for flow into the upright body portion through its forward inlet 110. The air then flows through the upright body portion wherein it is accelerated by reason of the progressively decreasing cross-sectional area of the channels extending through the upright body portion. Air flow is then directed through the channel extensions 102 in the horizontal body portion 100. The relatively accelerated air flow will function to draw spray from underneath the horizontal body portion through the eductor openings 107 for mixing with the air flow and exhausting through the outlet 105 toward the center of the vehicle. Hence, in this device the high velocity air screen that is generated by the upright body portion is utilized in the horizontal body portion to effect an eductor action drawing the spray into the device for discharge towards the center of the vehicle through the outlet of the device.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A spray control device for controlling the discharge of water spray generated by the rotation of wheels of a vehicle over a wet surface, comprising a hollow body mountable to a sidewall of the vehicle above and laterally outwardly in relation to a wheel of the vehicle, said hollow body having a vertically elongated forwardly opening inlet at a forward end thereof for intaking air into said hollow body during forward movement of the vehicle, a horizontally elongated laterally inwardly directed outlet at a lower edge of said body, and at least one channel extending from said inlet to said outlet for directing air flow from said inlet to said outlet, and wherein said at least one channel includes a plurality of said channels, said channels having respective inlet openings collectively forming said inlet and respective outlet openings collectively forming said outlet, and said hollow body includes a generally planar inner side wall, and said outlet openings are formed by respective horizontal slots in said inner side wall adjacent a lower edge of said inner side wall.

2. A spray control device for controlling the discharge of water spray generated by the rotation of wheels of a vehicle over a wet surface, comprising a hollow body mountable to a sidewall of the vehicle above and laterally outwardly in relation to a wheel of the vehicle, said hollow body having a vertically elongated forwardly opening inlet at a forward end thereof for intaking air into said hollow body during forward movement of the vehicle, a horizontally elongated laterally inwardly directed outlet at a lower edge of said body, and at least one channel extending from said inlet to said outlet for directing air flow from said inlet to said outlet, and wherein said one channel decreases in cross-sectional area from said inlet to said outlet whereby air flow speed is increased to create a high velocity air screen directed inwardly above and across the wheel toward the center of the vehicle.

3. A spray control device as set forth in claim 2, wherein said at least one channel includes a plurality of said channels, said channels having respective inlet openings collectively forming said inlet and respective outlet openings collectively forming said outlet.

4. A spray control device as set forth in claim 3, wherein each said outlet opening is narrower than the corresponding inlet opening.

5. A spray control device as set forth in claim 3, wherein said hollow body has inner and outer side walls joined at peripheral edges thereof, and at least one partition wall separating relatively adjacent channels.

6. A spray control device as set forth in claim 5, wherein said hollow body tapers from a relatively wide dimension at the forward end thereof to a relatively narrow dimension at the rear end thereof.

7. A spray control device as set forth in claim 2, in combination with the vehicle, said body being mounted to a sidewall of said vehicle above and laterally outwardly in relation to a wheel of said vehicle with said outlet disposed beneath the body of the vehicle.

8. A spray control device for controlling the discharge of water spray generated by the rotation of wheels of a vehicle over a wet surface, comprising a hollow body mountable to a sidewall of the vehicle above and laterally outwardly in relation to a wheel of the vehicle, said hollow body having a vertically elongated forwardly opening inlet at a forward end thereof for intaking air into said hollow body during forward movement of the vehicle, a horizontally elongated laterally inwardly directed outlet at a lower edge of said body, and at least one channel extending from said inlet to said outlet for directing air flow from said inlet to said outlet, and wherein said at least one channel includes a plurality of said channels, said channels having respective inlet openings collectively forming said inlet and respective outlet openings collectively forming said outlet, said hollow body has inner and outer side walls joined at peripheral edges thereof and at least one partition wall separating relatively adjacent channels, said hollow body tapers from a relatively wide dimension at the forward end thereof to a relatively narrow dimension at the rear end thereof, and said body has an upper edge which has a rearward portion that curves downwardly to a bottom rear end of said body.

9. A spray control device for controlling the discharge of water spray generated by the rotation of wheels of a vehicle over a wet surface, comprising a hollow body mountable to the vehicle for extending over a wheel of the vehicle, said hollow body having a bottom fender wall with a downwardly curved rear end portion for concentric disposition with a wheel of corresponding diameter, a forwardly opening inlet at a forward end of said hollow body for intaking air into said hollow body during forward movement of the vehicle, an outlet at a rearward end of said body, and at least one channel extending from said inlet to said outlet for directing air flow from said inlet to said outlet, said one channel terminating at a rear end portion thereof that extends laterally inwardly and downwardly at said outlet for directing air downwardly and laterally inwardly out through said outlet toward the center of the vehicle, said bottom fender wall including a plurality of educator openings communicating with said one channel, and said one channel decreasing in cross-sectional area from said inlet to said outlet whereby air flow speed is increased to create a corresponding pressure drop operative to draw water spray through said educator openings for mixing with the air flow and exhausting through said outlet both downwardly and laterally inwardly toward the center of the vehicle.

10. A spray control device as set forth in claim 9, wherein said at least one channel includes a plurality of said channels, said channels having respective inlet openings collectively forming said inlet and respective outlet openings collectively forming said outlet.

11. A spray control device as set forth in claim 10, wherein said hollow body includes an upper wall spaced above said fender wall, and the spacing between said upper and fender walls decreases going form said inlet to said outlet.

12. A spray control device as set forth in claim 11, wherein said hollow body includes at least one partition wall separating relatively adjacent channels, said partition wall extending initially parallel to a front-rear axis of said hollow body and then curves arcuately laterally inwardly in the downwardly curved rear end portion of said body.

13. A spray control device as set forth in claim 9, in combination with the vehicle, said hollow body being mounted to said vehicle directly over a wheel of said vehicle.

14. A spray control device as set forth in claim 9, wherein said eductor openings are formed by hooded slots that open rearwardly into said one channel.

15. A spray control device for controlling the discharge of water spray generated by the rotation of a wheel of a vehicle over a wet surface, comprising a hollow body having an upright body portion and a horizontal body portion configured for mounting to a side of the vehicle with the upright portion disposed above and laterally outwardly in relation to a wheel of the vehicle and the horizontal portion extending over the wheel, said hollow body having a vertically elongated forwardly opening inlet at a forward end of said upright body portion for intaking air into said hollow body during forward movement of the vehicle, a horizontally elongated laterally inwardly directed outlet at a laterally inner edge of said horizontal body portion, and at least one channel extending from said inlet to said outlet for directing air flow from said inlet to said outlet, said horizontal body portion having a bottom fender wall including a plurality of eductor openings communicating with said one channel, and said one channel decreasing in cross-sectional area from said inlet to said outlet whereby air flow speed is increased to create a corresponding pressure drop operative to draw water spray through said eductor openings for mixing with the air flow and exhausting through said outlet toward the center of the vehicle.

16. A spray control device as set forth in claim 15, wherein said at least one channel includes a plurality of said channels, said channels having respective inlet openings collectively forming said inlet and respective outlet openings collectively forming said outlet.

17. A spray control device as set forth in claim 15, wherein said upright body portion of said hollow body tapers from a relatively wide dimension at the forward end thereof to a relatively narrow dimension at the rear end thereof.

18. A spray control device as set forth in claim 15, wherein said upright body portion of said hollow body has an upper edge which has a rearward portion that curves downwardly to a bottom rear end of said upright portion.

19. A spray control device as set forth in claim 15, in combination with the vehicle, said hollow body being mounted to said vehicle with said upright body portion adjacent a sidewall of said vehicle above and laterally outwardly in relation to a wheel of the vehicle and said horizontal body portion disposed directly over the wheel.

* * * * *